United States Patent
Betschart et al.

(10) Patent No.: US 10,690,140 B2
(45) Date of Patent: Jun. 23, 2020

(54) COMPRESSOR

(71) Applicant: MAN DIESEL & TURBO SE, Augsburg (DE)

(72) Inventors: Michael Betschart, Vitznau (CH); Christoph Andris, Volketswil (CH)

(73) Assignee: MAN Energy Solutions SE, Augsburg (DE)

( * ) Notice: Subject to any disclaimer, the term of this patent is extended or adjusted under 35 U.S.C. 154(b) by 175 days.

(21) Appl. No.: 15/971,831

(22) Filed: May 4, 2018

(65) Prior Publication Data

US 2018/0328375 A1    Nov. 15, 2018

(30) Foreign Application Priority Data

May 15, 2017 (DE) .................. 10 2017 208 128

(51) Int. Cl.
| | |
|---|---|
| *F04D 29/058* | (2006.01) |
| *F04D 29/66* | (2006.01) |
| *F04D 29/053* | (2006.01) |
| *F04D 17/12* | (2006.01) |
| *H02K 7/09* | (2006.01) |
| *F04D 29/62* | (2006.01) |
| *F04D 29/056* | (2006.01) |

(52) U.S. Cl.
CPC ......... *F04D 29/058* (2013.01); *F04D 17/122* (2013.01); *F04D 29/053* (2013.01); *F04D 29/0563* (2013.01); *F04D 29/624* (2013.01); *F04D 29/668* (2013.01); *H02K 7/09* (2013.01); *F05D 2240/51* (2013.01)

(58) Field of Classification Search
None
See application file for complete search history.

(56) References Cited

U.S. PATENT DOCUMENTS

| | | | |
|---|---|---|---|
| 4,141,604 A * | 2/1979 | Habermann | ............ F01D 25/16 310/90.5 |
| 6,262,505 B1 | 7/2001 | Hockney et al. | |
| 9,657,744 B2 * | 5/2017 | Gilarranz | ............ F16C 32/0489 |
| 2008/0206079 A1 | 8/2008 | Okuda et al. | |

FOREIGN PATENT DOCUMENTS

| | | |
|---|---|---|
| DE | 10 2009 022 835 | 3/2011 |
| DE | 10 2015 016 055 | 6/2017 |
| WO | WO 2008/154 757 | 12/2008 |
| WO | WO 2014/032727 | 3/2014 |

* cited by examiner

*Primary Examiner* — Woody A Lee, Jr.
*Assistant Examiner* — Jason G Davis
(74) *Attorney, Agent, or Firm* — Cozen O'Connor

(57) ABSTRACT

A compressor having a compressor housing, a compressor rotor mounted in the compressor housing, which includes a shaft and moving blades forming multiple compressor stages. Between two compressor stages a magnetic bearing and a safety bearing are arranged, which, as split bearings, are each mounted on the shaft designed as one-piece shaft.

9 Claims, 1 Drawing Sheet

COMPRESSOR

BACKGROUND OF THE INVENTION

1. Field of the Invention

The invention relates to a compressor.

2. Description of the Related Art

Compressors, in terms of the present invention, are employed in industrial plants, for example in air separation plants. Compressors comprise a compressor housing and a compressor rotor mounted in the compressor housing, which provides multiple compressor stages.

To provide a desired compression of a medium to be compressed with a compressor, a multiplicity of compressor stages, seen in the flow direction of the medium to be compressed, are arranged one behind the other are required under certain conditions, which causes a relatively long design of a shaft of the compressor rotor. Long shafts of the compressor rotor however have a tendency towards vibrations, as a result of which the compressor dynamics are negatively affected. However, in order to provide relatively long shafts of compressor rotors that are less susceptible to vibration it is nevertheless usual in practice to embody the shafts with a larger diameter, as a result of which a larger and heavier design of the compressors is brought about on the whole. Alternatively, multiple compressors are connected in series.

Both the embodiment of shafts with larger diameter and also the embodiment series-connection of multiple compressors cause high costs and are therefore disadvantageous.

SUMMARY OF THE INVENTION

There is a need for a long design of the shaft, even on compressors the compressor rotors of which increase a length of a shaft with a relatively small diameter, to ensure a high number of compressor stages, specifically without negatively affecting the compressor dynamics.

The present invention is based on creating a new type of compressor.

According to one aspect of the invention, a magnetic bearing and a safety bearing are arranged between two compressor stages, which in each case are mounted as split bearings on the shaft formed as a one-piece shaft.

According to one aspect of the invention it is proposed to form a magnetic bearing and a safety bearing between two compressor stages, wherein the magnetic bearing and the safety bearing are embodied as split bearings mounted on the one-piece shaft of the compressor rotor. By way of the magnetic bearing, vibrations of the shaft of the compressor rotor can be dampened, wherein by way of the split embodiment of magnetic bearing and safety bearing the shaft can be embodied in one piece. This provides a compressor with a multiplicity of compressor stages having a one-piece shaft for the compressor rotor, which is of long design and with a small diameter.

According to a further development of the invention, the magnetic bearing and the safety bearing are received in a common bearing housing, wherein the bearing housing in section delimits a flow path between the two compressor stages, between which the magnetic bearing and the safety bearing are arranged. Because of this, the unit of magnetic bearing and safety bearing can be particularly advantageously integrated in the compressor.

Preferentially, stator-side elements of the magnetic bearing are received on a magnetic bearing carrier and stator-side elements of the safety bearing on a safety bearing carrier, wherein the magnetic bearing carrier and the safety bearing carrier are connected to one another and are preferentially mounted in the common bearing housing via the safety bearing carrier or via the magnetic bearing carrier. Preferentially, an adjustable support element acts on the safety bearing carrier or on the magnetic bearing carrier, via which the stator-side elements of magnetic bearing and safety bearing are jointly mounted on the bearing housing and are jointly alignable relative to the shaft. This allows a simple assembly of magnetic bearing and safety bearing on the common bearing housing and in addition to this an advantageous alignment of magnetic bearing and safety bearing relative to the shaft via the common support element.

Preferentially, the magnetic bearing is an active magnetic bearing that comprises a sensor for detecting shaft vibrations and an actuator for damping shaft vibrations. With the help of an active magnetic bearing, shaft vibrations of the shaft of the compressor rotor can be particularly advantageously dampened.

According to a further development of the invention, the bearing housing is received in a recess of the compressor housing and connected to the compressor housing, wherein preferentially on an upstream side of the bearing housing, housing-side diffuser blades and on a downstream side of the bearing housing, housing-side recirculation blades are arranged. The diffuser blades and recirculation blades absorb bearing forces, discharging these into the compressor housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this.

There it shows.

DETAILED DESCRIPTION OF THE PRESENTLY PREFERRED EMBODIMENTS

The invention present here relates to a compressor, for example to a compressor for an industrial plant, such as for example an air separation plant.

Figure 1:
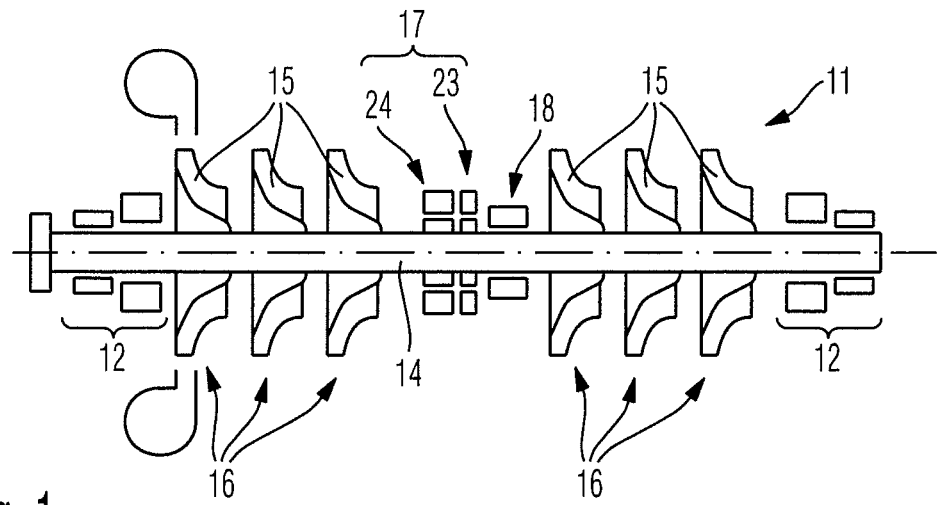
FIG. 1 is a detail of a compressor, namely a compressor rotor of the compressor.
Figure 2:
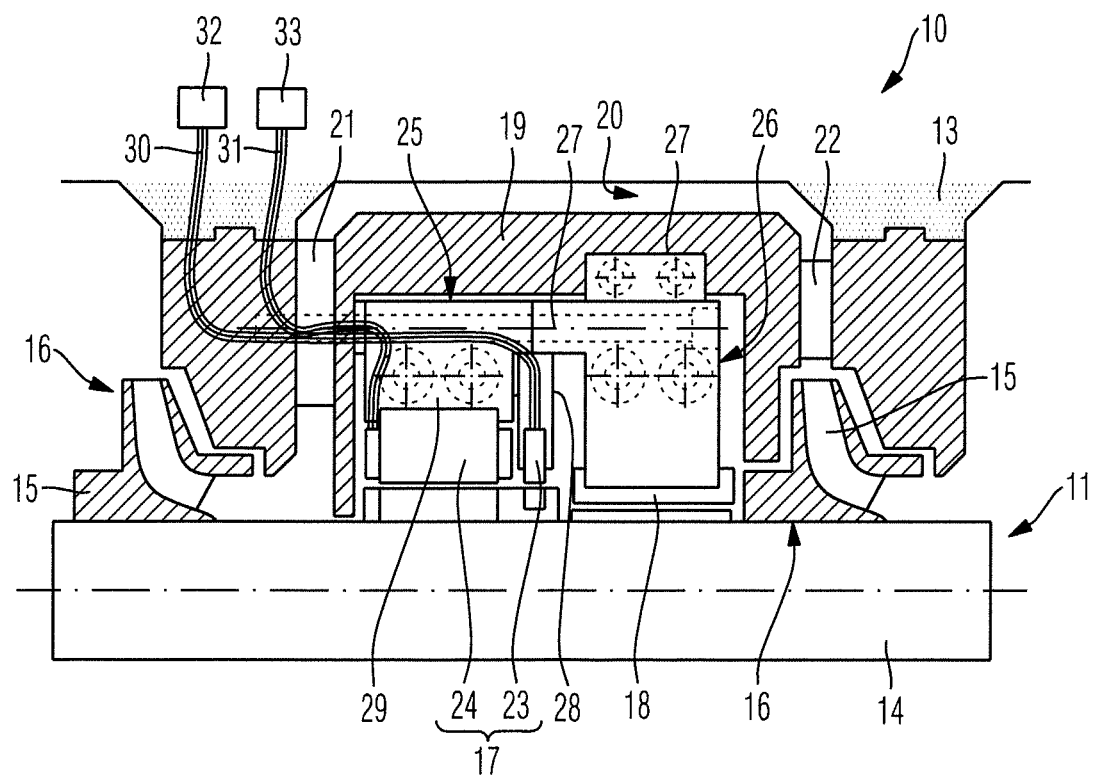
FIG. 2 is a further detail of the compressor.

FIGS. 1 and 2 show details of a compressor 10 according to one aspect of the invention, wherein in FIG. 1 a compressor rotor 11 of the compressor 10 is shown. The compressor rotor 11 is mounted via bearings 12 in a compressor housing 13 which is not shown in FIG. 1, however is visible in FIG. 2.

The compressor 10 comprises a shaft 14 and multiple moving blades 15 mounted on the shaft 14. The moving blades 15 form multiple moving blade rings and thus multiple compressor stages 16. In the exemplary embodiment shown in FIG. 1, the moving blades 15 form a total of six compressor stages 16 which, seen in the axial direction of the shaft 14, are arranged on the shaft 14 one behind the other.

A magnetic bearing 17 and a safety bearing 18 are arranged between two compressor stages 16, in the shown exemplary embodiment approximately in the axial centre of the shaft 14 between two compressor stages 16. It is pointed out that the arrangement of magnetic bearing 17 and safety bearing 18 need not be necessarily arranged in the region of the axial centre of the shaft 14, but this arrangement of magnetic bearing 17 and safety bearing 18 can also be moved in the direction of an axial end or an axial side of the shaft 14 of the compressor rotor 11.

Magnetic bearing 17 and safety bearing 18 in this case are embodied as split bearings, namely split in the horizontal direction, so that the magnetic bearing 17 and the safety bearing 18 can be mounted on the shaft of the compressor rotor 11 formed as one-piece shaft 14 between two compressor stages 16.

According to FIG. 2, the magnetic bearing 17 and the safety bearing 18 are received in a common bearing housing 19. The bearing housing 19 is inserted in a recess in the compressor housing 13, wherein the bearing housing 19 in sections delimits a flow path 20 between the two compressor stages 16, between which the bearing housing 19 and thus the magnetic bearing 17 and the safety bearing 18 are arranged.

From FIG. 2 it is evident that on an upstream side of the bearing housing 19, housing-side diffuser blades 21 and on a downstream side of the bearing housing 19, housing-side recirculation blades 22 are arranged, which are integrated in the flow path 20 delimited in sections by the bearing housing 19. Bearing forces which, emanating from the magnetic bearing 17 and safety bearing 18, can be introduced into the bearing housing 19, can be discharged into the compressor housing 13 via the housing-side diffuser blades 21 and housing-side recirculation blades 22.

In the shown, preferred exemplary embodiment, the magnetic bearing 17 is embodied as an active magnetic bearing that comprises a sensor 23 for detecting shaft vibrations of the shaft 14 and an actuator 24 for damping the shaft vibrations. Both the magnetic bearing 17 and also the safety bearing 18 comprise rotor-side elements and stator-side elements. The rotor-side elements are assigned to the shaft 14 of the shaft rotor 11 and rotate together with the shaft 14. The the stator-side elements of magnetic bearing 17 and safety bearing 18 are mounted on the stator-side bearing housing 19.

The stator-side elements of the magnetic bearing 17 are mounted on a magnetic bearing carrier 25 and the stator-side elements of the safety bearing 18 on a safety bearing carrier 26. Magnetic bearing carrier 25 and safety bearing carrier 26 in this case are connected to one another via fastening elements 27 which preferentially extend in the axial direction of the shaft 14, wherein the same are mounted on the bearing housing 19 with the help of a support element 27 either via the magnetic bearing 17 or, as shown, preferentially via the safety bearing carrier 26.

By way of the common support element 27, which is designed as adjustable support element and in FIG. 2 acts on the safety bearing carrier 26, safety bearing carrier 26 and magnetic bearing carrier 25 and thus the stator-side elements of magnetic bearing 17 and safety bearing 18 can be jointly aligned relative to the shaft 14 of the compressor rotor 11.

As already explained, the magnetic bearing 17 in the preferred exemplary embodiment is designed as active magnetic bearing, which comprises the sensor 23 and the actuator 24. Stator-assemblies of the sensor 23 in this case are preferentially fastened to a sensor carrier 28 of the magnetic bearing carrier 25 and stator-side elements of the actuator 24 on an actuator carrier 29 of the magnetic bearing carrier 25, wherein the sensor carrier 28 is fastened on the actuator carrier 29 and the actuator carrier 29 on the safety bearing carrier 26 in order to be mounted on the bearing housing 19 via the support element 27 acting on the safety bearing carrier 26.

FIG. 2, furthermore, shows cables 30, 31, wherein a first cable 31 leads to the actuator 24 and a second cable 30 to the sensor 23 of the magnetic bearing 17. Both cables 30, 31 can be connected via connectors 32, 33 to a control device which is not shown, which evaluates shaft vibrations detected by the sensor 23 and, dependent on this, activates the actuator 24 of the magnetic bearing 17 for damping the shaft vibrations.

With the invention it is possible to provide a compressor whose compressor rotor 11 in the axial direction has a relatively long and in the radial direction a relatively thin shaft 14, in order to provide a multiplicity of compressor stages 16 with a compressor that is small in design, namely without negatively affecting the dynamics of the compressor rotor 11. To this end, a magnetic bearing 17 and a safety bearing 18 are mounted on the one-piece shaft 14 of the compressor rotor 11 between two compressor stages 16, which in each case are embodied as split bearings, in order to be able to easily mount the same between the two compressor stages 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A compressor, comprising:
   a compressor housing;
   a compressor rotor arranged in the compressor housing comprising:
   a shaft formed as one-piece shaft; and
   moving blades forming multiple compressor stages arranged on the shaft;
   a magnetic bearing mounted as a horizontally split bearing on the shaft and arranged between two of the multiple compressor stages; and
   a safety bearing mounted as a split bearing on the shaft and arranged between two of the multiple compressor stages.

2. A compressor comprising:
a compressor housing;
   a compressor rotor arranged in the compressor housing comprising:
   a shaft formed as one-piece shaft; and
   moving blades forming multiple compressor stages arranged on the shaft;
a magnetic bearing mounted as a split bearing on the shaft and arranged between two of the multiple compressor stages;
a safety bearing mounted as a split bearing on the shaft and arranged between two of the multiple compressor stages; and
a common bearing housing in which the magnetic bearing and the safety bearing are received,
wherein the common bearing housing in sections delimits a flow path between the two compressor stages between which the magnetic bearing and the safety bearing are arranged.

3. The compressor according to claim 2, wherein the common bearing housing is received in a recess of the compressor housing and connected to the compressor housing.

4. The compressor according to claim 3, further comprising:
   housing-side diffuser blades arranged on an upstream side of the common bearing housing; and
   housing-side recirculation blades arranged, on a downstream side of the common bearing housing.

5. The compressor according to claim 2, further comprising:
   housing-side diffuser blades arranged on an upstream side of the common bearing housing; and
   housing-side recirculation blades arranged, on a downstream side of the common bearing housing.

6. The compressor according to any one of the claim 2, further comprising:
   a magnetic bearing carrier on which stator-side elements of the magnetic bearing are received; and
   a safety bearing carrier on which stator-side elements of the safety bearing are mounted;
   wherein the magnetic bearing carrier and the safety bearing carrier are connected to one another and are mounted in the common bearing housing via the magnetic bearing carrier or the safety bearing carrier.

7. The compressor according to claim 6, further comprising:
   an adjustable support that acts on the magnetic bearing carrier or on the safety bearing carrier, via which adjustable support the stator-side elements of magnetic bearing and the safety bearing are jointly mounted on the common bearing housing and can be jointly aligned relative to the shaft.

8. The compressor according to claim 7, wherein the magnetic bearing is an active magnetic bearing comprising:
   a sensor configured to detect shaft vibrations; and
   an actuator configured to damp the shaft vibrations.

9. The compressor according to claim 8,
   wherein the magnetic bearing carrier comprises an actuator carrier and a sensor carrier,
   wherein the sensor carrier is connected to the actuator carrier, and
   wherein the actuator carrier is connected to the safety bearing carrier.

* * * * *